US008802749B2

(12) United States Patent
Di et al.

(10) Patent No.: US 8,802,749 B2
(45) Date of Patent: Aug. 12, 2014

(54) LIGNITE-BASED FOUNDRY RESINS

(71) Applicants: Jianbo Di, Palatine, IL (US); Joseph M. Fuqua, Fond du Lac, WI (US)

(72) Inventors: Jianbo Di, Palatine, IL (US); Joseph M. Fuqua, Fond du Lac, WI (US)

(73) Assignee: Amcol International Corporation, Hoffman Estates, IL (US)

( * ) Notice: Subject to any disclaimer, the term of this patent is extended or adjusted under 35 U.S.C. 154(b) by 0 days.

(21) Appl. No.: 13/867,835

(22) Filed: Apr. 22, 2013

(65) Prior Publication Data
US 2013/0237635 A1  Sep. 12, 2013

Related U.S. Application Data

(60) Division of application No. 13/188,919, filed on Jul. 22, 2011, now Pat. No. 8,436,073, which is a continuation-in-part of application No. 12/574,475, filed on Oct. 6, 2009.

(51) Int. Cl.
*B22C 1/22* (2006.01)

(52) U.S. Cl.
USPC .......................................... 523/139; 523/142

(58) Field of Classification Search
None
See application file for complete search history.

(56) References Cited

U.S. PATENT DOCUMENTS

| | | | |
|---|---|---|---|
| 3,023,113 A | 2/1962 | Barlow | |
| 3,083,118 A | 3/1963 | Bridgeford | |
| 3,330,686 A | 7/1967 | Rose | |
| 3,409,579 A | 11/1968 | Robins | |
| 3,429,848 A | 2/1969 | Robins | |
| 3,432,457 A | 3/1969 | Robins | |
| 3,445,251 A | 5/1969 | Nevins | |
| 3,535,359 A * | 10/1970 | Rockstroh et al. | 560/331 |
| 3,645,937 A * | 2/1972 | Lang et al. | 523/139 |
| 3,676,392 A | 7/1972 | Robins | |
| 3,743,621 A | 7/1973 | Molotsky | |
| 3,832,191 A | 8/1974 | Bolding et al. | |
| 3,862,080 A | 1/1975 | Standen et al. | |
| 3,925,296 A | 12/1975 | Stone et al. | |
| 3,947,392 A * | 3/1976 | Lang et al. | 523/139 |
| 4,247,432 A * | 1/1981 | Huang et al. | 524/424 |
| 4,311,631 A | 1/1982 | Myers et al. | |
| 4,359,339 A | 11/1982 | Van Fisk, Jr. | |
| 4,400,475 A | 8/1983 | Kennedy | |
| 4,417,998 A | 11/1983 | Kennedy | |
| 4,452,905 A * | 6/1984 | Drinkuth et al. | 501/81 |
| 4,532,260 A * | 7/1985 | MacKeighen et al. | 521/84.1 |
| 4,586,936 A | 5/1986 | Schaffer et al. | |
| 4,595,646 A * | 6/1986 | Tsubuko et al. | 430/115 |
| 4,597,878 A | 7/1986 | House et al. | |
| 4,608,397 A * | 8/1986 | Reischl | 521/101 |
| 4,705,570 A | 11/1987 | Paul et al. | |
| 4,734,439 A | 3/1988 | Reischl | |
| 4,735,973 A * | 4/1988 | Brander | 523/139 |
| 4,801,621 A | 1/1989 | Reischl | |
| 4,851,457 A | 7/1989 | Kurple | |
| 4,855,052 A | 8/1989 | Reischl | |
| 4,983,505 A * | 1/1991 | Higuchi et al. | 430/270.11 |
| 5,244,473 A | 9/1993 | Sardessai et al. | |
| 5,320,157 A | 6/1994 | Siak et al. | |
| 5,376,696 A | 12/1994 | Dunnavant et al. | |
| 5,430,072 A | 7/1995 | Muller et al. | |
| 5,455,287 A | 10/1995 | Carpenter et al. | |
| 5,585,428 A | 12/1996 | Quinn et al. | |
| 5,611,853 A | 3/1997 | Morimoto | |
| 5,616,628 A | 4/1997 | Von Bonin et al. | |
| 5,688,313 A * | 11/1997 | Landis | 106/38.2 |
| 5,695,554 A | 12/1997 | Landis | |
| 5,710,095 A * | 1/1998 | Horsten et al. | 503/210 |
| 5,769,933 A | 6/1998 | Landis | |
| 5,810,918 A * | 9/1998 | Landis | 106/38.22 |
| 5,856,375 A | 1/1999 | Chang et al. | |
| 5,859,091 A | 1/1999 | Chen et al. | |
| 5,911,269 A | 6/1999 | Brander et al. | |
| 5,916,826 A | 6/1999 | White | |
| 6,005,021 A | 12/1999 | Chen et al. | |
| 6,136,888 A | 10/2000 | Torbus et al. | |
| 6,264,775 B1 | 7/2001 | Holeschovsky et al. | |
| 6,288,139 B1 * | 9/2001 | Skoglund | 523/143 |
| 6,291,550 B1 | 9/2001 | Chen et al. | |
| 6,506,223 B2 | 1/2003 | White | |
| 6,506,817 B1 | 1/2003 | Buchler | |
| 6,509,392 B1 * | 1/2003 | Jhaveri et al. | 523/142 |
| 6,554,049 B2 | 4/2003 | Steele et al. | |
| 6,559,203 B2 | 5/2003 | Hutchings et al. | |
| 6,719,835 B2 | 4/2004 | Brown | |
| 6,772,820 B2 | 8/2004 | Roze et al. | |
| 6,822,042 B2 | 11/2004 | Capps | |

(Continued)

FOREIGN PATENT DOCUMENTS

| | | | |
|---|---|---|---|
| JP | 58093791 A * | 11/1981 | |
| WO | WO-2009/0635015 | 5/2009 | |
| WO | WO 2009065018 A1 * | 5/2009 | |

*Primary Examiner* — James J Seidleck
*Assistant Examiner* — Peter A Salamon
(74) *Attorney, Agent, or Firm* — Marshall, Gerstein & Borun LLP

(57) ABSTRACT

Described herein, in the preferred embodiment, is a leonardite-based polyurethane resin binder that may be used, among other applications, as a binder in combination with foundry aggregate, e.g., sand, for molding or casting metal parts. The binders described herein comprise a humic substance, preferably leonardite, combined with a polymerizable polyol, an isocyanate, and a polymerization catalyst to make a polyurethane resin binder in situ in a foundry aggregate, such as sand. The lignite is mixed with the polymerizable polyol and dispersing agents as additives to improve the suspension quality and binder performance of the lignite-containing part of the binder components.

11 Claims, No Drawings

(56) References Cited

U.S. PATENT DOCUMENTS

| | | |
|---|---|---|
| 6,834,706 B2 | 12/2004 | Steele et al. |
| 6,846,849 B2 | 1/2005 | Capps |
| 6,881,360 B2 * | 4/2005 | Stange et al. ............ 264/18 |
| 6,972,302 B2 | 12/2005 | Baker et al. |
| 7,871,972 B2 | 1/2011 | SenGupta |
| 8,309,620 B2 | 11/2012 | Fuqua |
| 8,426,494 B2 | 4/2013 | Fuqua et al. |
| 8,436,073 B2 | 5/2013 | Di et al. |
| 2004/0039235 A1 | 2/2004 | Bergstrom et al. |
| 2005/0017394 A1 | 1/2005 | Hochsmann et al. |
| 2007/0281876 A1 | 12/2007 | Garner et al. |
| 2008/0277351 A1 | 11/2008 | Harman et al. |
| 2009/0162408 A1 | 6/2009 | SenGupta |
| 2009/0314461 A1 | 12/2009 | Attridge et al. |
| 2010/0319874 A1 | 12/2010 | Thiel et al. |
| 2011/0019044 A1 | 1/2011 | Wang et al. |
| 2011/0079366 A1 | 4/2011 | Fuqua et al. |
| 2011/0081270 A1 | 4/2011 | Fuqua |
| 2011/0082233 A1 | 4/2011 | SenGupta et al. |
| 2011/0277952 A1 | 11/2011 | Di et al. |

* cited by examiner

LIGNITE-BASED FOUNDRY RESINS

CROSS-REFERENCE TO RELATED APPLICATIONS

This is a Division of U.S. application Ser. No. 13/188,919 filed Jul. 22, 2011, which is a Continuation-In-Part of U.S. patent application Ser. No. 12/574,475, filed on Oct. 6, 2009, is hereby claimed, and its entire disclosure is incorporated herein by reference in its entirety.

TECHNICAL FIELD

This invention relates to polymerizable resin binders, particularly useful as foundry binders, processes for making foundry shapes by curing the binders in place after forming a foundry mold or core, foundry mixes and multi-part resin binder components or kits that are mixed on site to bind foundry aggregate, such as sand, in a desired shape.

BACKGROUND AND PRIOR ART

In the foundry art, sand casting is used to make metal parts. In sand casting, foundry shapes called molds, exterior casting forms, and cores, interior casting forms, are made from a mixture of a foundry aggregate, such as sand, and a binder. The two categories of sand molds are "green" and "rigid." Green sand molds are bonded with clay and water. Rigid sand molds are bonded with organic resins and can be hardened using one of several methods, including baking, curing with a chemical reagent, and flushing with a reactive gas. Molten metal is poured into and around the foundry shapes after they have hardened. The binders, e.g., phenol formaldahyde resins, or phenol-isocyanate (polyurethane) resins, used to form foundry shapes typically contain a significant amount of organic solvent, which can emit noxious fumes, as well as free reactants, e.g., formaldehyde or isocyanate and free phenol, that are detrimental to the cast metal and the foundry environment.

A urethane binder resin, when used in combination with a foundry aggregate such as sand, typically has three parts: a polymerizable polyol component, an isocyanate component, and a catalyst component. The polymerizable polyol compound, e.g., a polyol, such as ethylene glycol, and isocyanate react to form a cross-linked polymer which increases the tensile strength and/or hardness of the sand/binder mixture. The catalyst prompts the polymerizable components of the binder to polymerize, allowing for rapid conversion of the foundry mix into a hard and solid cured state suitable for forming shapes from molten metal poured therein.

Humic substances containing a plurality of hydroxyl groups have been asserted to represent an alternative reactant to the conventional phenol reactant for reactions with isocyanates in the formation of binder resins (see WO 2009/065018 A1). Humic substances include humic acid, fulvic acid, hymatomelanic acid, ulmic acid, and humin. As stated in WO 2009/065018 A1, humic substances contain hydroxyl groups that react with an isocyanate to form polyurethane resins. Humic acid has previously been included in foundry sand compositions. See U.S. Pat. Nos. 3,023,113 and 3,832,191. Humic acid can be derived from several sources, including lignite, leonardite, peat, and manure. Lignite and leonardite are preferred sources because they are rich in humic acid and readily mined. Lignite is an organic mineraloid that is the lowest rank of coal. Known as "brown coal," lignite has a high inherent moisture content of up to 66 wt. % and a high ash content compared to other forms of coal. Lignite has previously been used as an additive in foundry sand compositions comprising an additional binding agent such as bentonite clay. See U.S. Pat. Nos. 3,445,251 and 4,359,339. When lignite becomes highly oxidized, leonardite is formed. Oxidation increases the humic acid and carbonyl group content. Leonardite particles are generally anionically charged and composed primarily of the mixed salts of humic acid, ulmic acid, and fulvic acid. The humic acid in leonardite is soluble in alkaline solutions and can be extracted from a solid phase source using a strong base, such as sodium hydroxide or potassium hydroxide.

A humic substance containing composition, for use as a polyol component in urethane resin for use as a foundry sand binder is described in WO 2009/065018 A1. This prior art composition was found to have a short shelf life, with the composition showing gross separation (settling) of humic solids, and/or turning into a stiff (i.e. no fluidity) gel within a short duration of storage. The separation of the humic solid prevents the ready standardization of the addition of the humic solids to foundry aggregate over the course of normal foundry mold and core production. These variations in the composition of the foundry mix can affect casting performance of the foundry shape thereby impacting the cost and quality of the resultant casting in a negative manner. To provide a consistent and repeatable amount of humic solids to the foundry mix, the humic solids are herein provided in a stable liquid form. The multi-component kits described herein include a lignite-polyol suspension that contains a lignite, a polyol, and a dispersing agent. Unlike reported examples, lignite-polyol suspensions described herein are stable against separation of suspended solids. Furthermore, the addition of the dispersing agents would be expected to impair the performance of the foundry mix; however, the resin compositions surprisingly have been found to have improved binder performance compared to the binders of the prior art.

SUMMARY

Described herein, in the preferred embodiment, is a lignite-containing polyurethane resin binder that may be used, among other applications, as a binder of foundry aggregate, e.g., sand, for producing molds and cores for metal castings. The herein described kit can be used to make foundry molds and cores using the separate components of (a) a lignite, a polymerizable polyol, and a dispersing agent; (b) a polymerizable isocyanate; and (c) a catalyst. The components (a), (b), and (c) are, preferably, separately stored. In another preferred embodiment, the components are admixed with a foundry aggregate to form a foundry mix which can be pressed or molded into a foundry shape.

DETAILED DESCRIPTION

Foundry shapes can be formed from foundry mix, e.g., from stable lignite-polyol suspensions by the in situ reaction of a polyol with a polymerizable isocyanate, admixed with a foundry aggregate. In a preferred embodiment, a stable lignite-polyol suspension, a polymerizable isocyanate, and a polyurethane polymerization catalyst are provided as a multi-component kit for admixing with a foundry aggregate, to form a foundry mix. The formation of the foundry mix typically involves the stepwise addition of the kit components to the foundry aggregate, e.g. sand, with mixing, to form a foundry mix that sets over the course of a predetermined time, typically minutes. The admixing of the kit components can be either stepwise in the foundry aggregate or some of the kit components, e.g., the polyol component and/or the catalyst component, can be admixed prior to admixing with the foundry aggregate. The kit components form a solid-polyurethane resin that binds the foundry aggregate and permits the formation of a foundry shape useful in metal casting. Another aspect of the multi-component kit described herein is to provide foundry mixes utilizing the resin components.

The multi-component kits perform exceptionally well as binders in sand castings. Finished metal castings were produced from molds formed to a desired shape with the multi-component kits admixed with the foundry aggregate, as described in further detail below. Compared to conventional phenol-formaldehyde and phenol-isocyanate resin binders, the herein described foundry shapes made from the herein described multi-component kits, possess three significant benefits: 1) superior sand shakeout and better core burn out; 2) non-noxious smoke during pouring, cooling, and shakeout; and 3) very low odor at mixing. Moreover, the herein described foundry shapes exhibit limited thermal shock and subsequently have a very high hot strength making them superior molds for metal casting. The quality of shakeout is an important consideration because aggregate and binder residue on the finished casting can impair the quality and/or performance of the finished casting.

The multi-component kits described herein comprise an organic solid having an insoluble component that is completely combustible. In this instance, insoluble means that one of ordinary skill using solvents typical of the art cannot fully solvate the organic solid and completely combustible means that the high temperature pyrolysis of the organic solid leaves little to no inorganic residue. Preferably, the organic solid is humic organic matter, wherein humic organic matter is a catchall term for biopolymers occurring in soil, sediment, and water. Typically, the humic organic matter is a humic substance, e.g. a humic acid-containing or humic acid salt-containing ore. More preferably, the humic organic matter is a lignite, even more preferably leonardite, previously described in this Assignee's U.S. Pat. Nos. 5,695,554 and 5,688,313, and hereby incorporated by reference.

Another important aspect of the multi-component kit is the stability of the kit over time. The separation of the lignite solids (particles) from the lignite-polyol suspension after preparation would be detrimental to the transport, storage, and utility of the suspension. Herein, the described lignite-polyol suspensions are stable over a sufficient time to allow remote manufacturing of the suspension, and subsequent transport, storage, and use without reagitation of the suspension.

The lignite-polyol suspension is an admixture of a lignite, a polymerizable polyol, a dispersing agent and, optionally, a organic solvent. Preferably the lignite-polyol suspension has good stability against separation; and good performance in urethane polymerization, leading to good binder properties. As used herein, the lignite-polyol admixture is termed a suspension, this is used in a broad sense; the suspension can be a homogeneous mixture, a heterogeneous mixture, an emulsion, and the like.

The lignite component is a humic substance, e.g. a humic acid-containing or humic acid/salt-containing ore. The humic substance is preferably a lignite, preferably leonardite, as previously described in this Assignee's U.S. Pat. Nos. 5,695, 554 and 5,688,313, each hereby incorporated by reference. In one embodiment, the humic substance is a solid lignite component, that contains less than about 35% water, or about 0 wt. % to about 20 wt. % water, preferably about 0 wt. % to about 10 wt. %, based on the dry weight of the lignite. The lignite (i.e., lignite particles) has an average diameter of less than about 50 µm, 30 µm, 20 µm, 15 µm, 10 µm, or 5 µm.

In another embodiment, the lignite component is leonardite (e.g., leonardite particles) and incorporated into the foundry mix at a concentration from about 1 to about 70 wt. % of the resin in the final foundry mix, preferably from about 5 to about 50 wt. %, more preferably from about 10 to about 30 wt. %. The concentrations are based on the total dry weight of lignite and the total weight of added active polymerizable polyol and isocyanate. The leonardite has an average diameter of less than about 50 µm, 30 µm, 20 µm, 15 µm, 10 µm, or 5 µm. the leonardite can have a mean particle size within a range of about 5, 10, 15, 20, 25, 30, 40, 50, 60, 70, 80, 90, 100 nm to about 100, 200, 300, 400, 500, 600, 700, 800, 900, 1000, 5000, 10000 nm.

Suitable polymerizable polyols include, but are not limited to, glycols and glycerols. Glycols include those linear glycols that have a molecular formula of $HO-(CH_2CH_2O)_x-H$, where x is a value between 1 and about 25; and the branched polyols that have a molecular formula of $HO-(CH_2CH_2(R)O)_x-H$, where x is a value between 1 and about 25, and R is a linear, branched, cyclic, alkyl, and/or aromatic group that optionally includes one or more pnictide, chacogenide, and/or halide-containing functionalities. One preferred class of the branched polyols are the glycerols, wherein R contains an alcohol functionality. Suitable polyols additionally include mixed glycols and mixed glycerols. An illustrative example of a mixed glycol is a hydroxy-ethyleneglycol-p-xylene $(HOCH_2C_6H_4CH_2OCH_2CH_2OH)$. Preferably, the polymerizable polyol is a linear glycol having a molecular formula wherein x is a value between 1 and about 10, more preferably wherein x is between 1 and about 5, and even more preferably 3, wherein the glycol is triethylene glycol.

The lignite-polyol suspension further includes a dispersing agent that should prevent or retard the separation of the lignite from the polyol. Preferably, the dispersing agent is an urethane compatible polymer.

Suitable dispersing agents bind and/or absorb onto the surfaces of particles of the organic solid, and provide particle-to-particle repulsion, often steric repulsion. Dispersing agents include homopolymers and copolymers selected from the group consisting of polyethylene glycol/poly(oxyethylene) (PEG), polyvinylpyrrolione (PVP), polypropylene glycol, poly(acrylic acid) (PAA), poly(methacrylic acid) (PMA), poly(vinyl alcohol) (PVA), poly(acrylamide), poly(ethylene imine), poly(diallyldimethyl ammonium halide), poly(vinyl methyl ether), polyetheramine, gelatins, and polysaccharides.

In one embodiment, the dispersing agent includes nonesterified, monoesterified, or diesterified homo- or co-polymer of polyethylene glycols (PEG). Preferably, the weight average molecular weight of the PEG-based dispersing agent is in the range of about 1,000 to about 60,000 Dalton, more preferably about 2,000 to about 30,000 Dalton, and most preferably about 4,000 to about 10,000 Dalton.

Commercial PEG polymers are generally labeled as either PEG-n or PEG M, where (n) refers to the average number of ether oxygen groups or the ethylene oxide (EO) repeat units, and the letter (M) refers to an average molecular weight of the polymer. For example, a PEG with n=150 would have an average molecular weight of about 6,000 Dalton and would be labeled as either PEG-150 or PEG 6000. For consistency herein, the PEG polymers are referred to by the average number of EO repeat units per polymer chain and one of ordinary skill in the art can convert one denotation to another.

In this embodiment, the preferred PEGs are those monoesterified-PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. Esterified PEGs preferably have an ester functionality that is a linear, branched, cyclic and/or aromatic group. Preferably, the ester functionality is a linear or branched alkyl group with an alkyl chain length equal to or greater than about 8 ($C_8$). More preferably the alkyl chain length is about C8-C18, still more preferably the alkyl chain is stearate; three non-limiting examples include PEG-100 monostrearate, PEG-125 monostearate, and PEG-150 monostrearate.

In another embodiment, the dispersing agent includes polyvinylpyrrolidone (PVP) polymers and copolymers. Preferably, the weight average molecular weight of the PVP dispersing agent is in the range of about 1,000 to about 1,000,000 Dalton, more preferably about 4,000 to about 500,000 Dalton, and most preferably about 10,000 to about 100,000 Dalton. For example, one applicable PVP homopolymer dispersing agent has a weight average molecular weight of 60,000 Dalton, e.g., (PVP K-30; CAS No. 9003-39-8). Similar to the above disclosed PEG dispersing agents, PVP dispersing agents can be copolymers, including block and graft copolymers, of pyrrolidone and vinyl acetate, vinyl amine, lauryl methacrylate, methyl methacrylate, acrylic acid, methacrylic acid, hydroxystearate, dimethylsiloxane, diallyldimethyl ammonium halide, and/or ethylenimine.

Copolymer dispersing agents include those polymers made from two or more different monomers. The preferable monomers include propylene oxide, vinyl acetate, vinyl amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, and methacrylic acid. Preferably, one of the monomers is ethylene oxide. More preferably, the mole-fraction of the comonomer to ethylene oxide in the dispersing agent is preferably ≤0.4, more preferably ≤0.3, and even more preferably ≤0.2.

The dispersing agent can be incorporated into the lignite-polyol suspension in a concentration of about 0.1 to about 30 wt. %, preferably about 0.25 to about 20 wt. %, more preferably about 0.5 to about 15 wt. %, based on the weight of the lignite in the suspension.

The isocyanate component is preferably a polyisocyanate, for example a diisocyanate, a triisocyanate, and so on. The isocyanate component can be either a small molecule isocyanate, a polymeric isocyanate, or a blend of a plurality of isocyanates. Suitable isocyanates include p-phenylene diisocyanate (CAS No. 104-49-4), toluene diisocyanate (CAS No. 1321-38-6), 4,4'-methylenebis(phenylisocyanate) (CAS No. 101-68-8), polymethylene polyphenyl isocyanate (CAS No. 9016-87-9), 1,5-naphthalene diisocyanate (CAS No. 3173-72-6), bitolylene diisocyanate (CAS No. 91-97-4), m-xylene diisocyanate (CAS No. 3634-83-1), m-tetramethylxylene diisocyanate (CAS No. 58067-42-8), hexamethylene diisocyanate, (CAS No. 4098-71-9), 1,6-diisocyanato-2,2,4,4-tetramethylhexane (CAS No. 83748-30-5), 1,6-diisocyanato-2,4,4-trimethylhexane (CAS No. 15646-96-5), trans-cyclohexane-1,4-diisocyanate (CAS No. 2556-36-7), 1,3-bis (isocyanatomethyl)cyclohexane (CAS No. 38661-72-2), 3-isocyanato-methyl-3,5,5-trimethylcyclohexyl isocyanate (CAS No. 4098-71-9), dicyclohexylmethane diisocyanate (CAS No. 5124-30-1) and the polymeric 4,4'-methylene bis (phenylisocyanates) available under the MONDUR product line from BAYER MATERIALSCIENCE. Preferably, the isocyanate component is the "Mondur MR" product available from BAYER MATERIALSCIENCE.

Catalyst components for making rigid polyurethane materials include tin and tertiary amine catalysts. The catalyst component can favor either the gelation reaction (urethane formation) or the blowing reaction (urea formation), as understood in the art. A non-limiting list of polyurethane polymerization catalysts include 1,4-diazabicyclo[2.2.2]octane (DABCO), 1,5-diazabicyclo[4.3.0]non-5-ene (DBN), 1,8-diazabicyclo[5.4.0]undec-7-ene (DBU), pentamethyldipropylenetriamine, bis(dimethylamino ethyl)ether, pentamethyldiethylenetriamine, dimethylcyclohexylamine, tris (3-dimethylamino)propylamine, 4-phenol propyl pyridine, other liquid tertiary amines, and gaseous amines, e.g., trimethyl amine, methyl amine, dimethyl amine, and ethyl dimethyl amine.

One process for preparing the lignite-polyol suspension described herein comprises: (1) heating a mixture of a polyol and a dispersing agent to 70° C. in a suitable vessel; (2) admixing the mixture with lignite in a high-shear mixer at 70° C.; and (3) cooling the batch under agitation to ambient temperature. The lignite-polyol suspension components can included in the following weight percents to the total weight of the suspension: (A) about 0.1, 1, 5, 10 wt. % to about 40, 55, 70, 85 wt. % lignite; (B) about 15, 20, 25, 30 wt. % to about 60, 70, 80, 90 wt. % polyol; and (C) about 0.01, 0.5, 1 wt. % to about 15, 20, 25, 30 wt. % dispersing agent.

In an exemplary embodiment, the dispersing agent is PEG-100 stearate at a concentration of about 0.1 to 25 wt. % based on the total weight of the lignite, dry basis, more preferably about 0.5 to about 5 wt. %. The polyol, preferably triethylene glycol, is incorporated at a concentration of about 15 to about 90 wt. %, based on the total final weight of the lignite-polyol suspension, more preferably of about 40 to about 70 wt. %.

In another embodiment, the lignite-polyol suspension further comprises an alkali, which, theoretically, may increase the solubility of the humic acid in the polyol. Sodium hydroxide or a comparable alkaline solution is added to the polyol-dispersing agent mixture at a concentration of active base from about 0.5 to 30 wt. % of the lignite, more preferably from about 5 to about 15 wt. %.

In another exemplary embodiment, an organic solvent is included in the polyol component, often admixing the organic solvent with the polyol prior to heating and mixing with the dispersing agent. The molar ratio of the solvent to the polyol is about 0.01, 0.05, 0.1, 0.5 to about 1.5, 3, 9. Preferably, the organic solvent does not affect the polyurethane polymerization. Examples of organic solvents that do not affect the polyurethane polymerization reaction are well know to those of ordinary skill in the art, some examples of organic solvent classes include aromatics, ketones, nitriles, acetates, ethers, and aldehydes. In one, non-limiting, example with triethylene glycol, the organic solvent is propylene carbonate and the molar ratio of the propylene carbonate to triethylene glycol was 1:9 (i.e., ≈0.111).

The type of aggregate and amount of binder used to prepare foundry mixes can vary widely and is known to those skilled in the art. One preferred aggregate is silica sand. Other suitable aggregate materials include olivine, zircon, chromite, carbon, fluid coke, related materials, and aggregate mixtures.

The multi-component kits are preferably used as binders in combination with foundry aggregate at concentrations at about 0.1 to about 10 wt. %, more preferably at about 1 to about 2.5 wt. %, based on the dry weight of the aggregate.

In one embodiment for preparing a foundry shape, the components of the multi-component kits (i.e., the lignite-polyol suspension, the polymerizable isocyanate, and the polyurethane polymerization catalyst) are individually admixed with the foundry aggregate. In one embodiment, the components of the multi-component kits are added in amounts where the molar ratio of the isocyanate functionalities (of the polymerizable isocyanate) to the alcohol functionalities (in the lignite-polyol suspension) is greater than 1. In this embodiment, there is an excess of isocyanate functionalities in any resultant mixture of the lignite-polyol suspension and the polymerizable isocyanate (i.e., an excess of the polymerizable isocyanate). The resultant foundry mixture is then mixed until nearly homogeneous, and then formed into a foundry shape. In yet another embodiment, the lignite-polyol suspension is premixed with the catalyst component, and the resulting mixture is then admixed with the foundry aggregate. In still another embodiment, the isocyanate is premixed with the catalyst component and the resulting mixture is then admixed with the foundry aggregate.

The foundry mixture is then formed into a foundry shape (i.e., shaping the foundry mixture). Generally in the art, the mold and the core are made from different foundry mixtures. The mold mix commonly comprising a clay binder and the core mix commonly comprising a polymer binder. After casting, the majority of the spent foundry shape is removed from the cast shape by shake-out. During shake-out the majority of the mold breaks free from the casting and some of the core is removed. Often the core-binders are not destroyed during casting and must be physically broken from the internal areas of the core. Following the shake-out process and core-removal, the casting is cleaned, wherein residual aggregate is removed by primarily shot blasting. Here, metal flashing and aggregate is removed from the surface of the casting and metal is often adhered to the aggregate. This multi-step process for isolating a cast shape is time consuming, costly, as well as energy and material intensive. The herein described materials and methods significantly reduce the time and energy necessary for the isolation of a cast shape by improving the shake-out, the core removal process, and the number of foundry mixtures necessary to make a shape. Preferably, the mold and the core are manufactured with the herein described foundry mix and after casting are cleanly broken from the cast shake during shake-out.

In a preferred embodiment, the core is manufactured from the herein described foundry mixture. Preferably, the binders in the core shape are fully destroyed by the heat of the liquid metal and following the solidification of the metal flow freely from the core area during shakeout. More preferably, about 30 to about 60% more aggregate is removed during shake-out when the herein described foundry mixture is used to form the foundry shape. Even more preferably and possibly due to improved burn-out of the binder, the reclamation costs for the aggregate are decreased by about 20 to about 50%.

The metal casting (an article of manufacture) is preferably formed by pouring liquid metal into the foundry shape. The metal making up the casting and/or the liquid can be any metal capable of being cast in an aggregate shape. Examples of metals include iron, steels, carbon steels, stainless steels, chromium steels, alloys, aluminum, titanium, zinc, copper, silver, gold, platinum, palladium, nickel, cobalt, manganese, and mixtures thereof. Preferably, the liquid metal is poured at a sufficiently high temperature to facilitate the burnout of the core resin.

The compositions and processes described herein have been primarily described and illustrated in terms of their use in the foundry art, but those skilled in the art will recognize that the binder resins and binder resin-containing compositions described herein may also be utilized in other fields, including adhesives, coatings, and composites.

EXAMPLES

The following examples further illustrate the preparation of several foundry binder compositions within the scope of the present invention. Those skilled in the art will recognize that similar compositions may be prepared containing quantities and species of materials different from those represented in the examples. In the examples, the lignite had a maximum particle size of 14 µm.

Example 1

A foundry mixture was prepared by admixing (A) a lignite-polyol suspension that includes about 10 wt % of lignite, about 77 wt % of Jeffol G30-650, about 9 wt % propylene carbonate, and about 4 wt % polyvinylpyrrolidone, (B) an isocyanate solution that includes about 10 wt % of propylene carbonate, about 90 wt % of MONDUR MR, and (C) silica sand (FL). N,N-Dimethylethylamine was used as a gaseous polymerization catalyst. The binder loading was 1.05 wt. % based on the total weight of the silica sand.

Example 2

A foundry mixture was prepared by admixing (A) a lignite-polyol suspension that includes about 15 wt % of lignite, about 72.5 wt % of triethylene glycol, about 8.1 wt % propylene carbonate, and about 4.4 wt % polyvinylpyrrolidone, (B) an isocyanate solution that includes about 10 wt % of propylene carbonate, about 90 wt % of MONDUR MR, and (C) silica sand. 4-phenol propyl pyridine was used as a liquid polymerization catalyst. The binder loading was 1.2 wt. % based on the total weight of the silica sand. The foundry mixture was formed into a mold and core for the compressor housing, no graphite wash was applied. Class 30 gray iron was then cast into the foundry shape (including the mold and core) at a pouring temperature of 2600° F. The cast metal was then allowed to cool to about 500° F., the aggregate was removed by shake out.

Example 3

A foundry mixture was prepared by admixing (A) a lignite-polyol suspension that includes about 15 wt % of lignite, about 72.5 wt % of triethylene glycol, about 8.1 wt % propylene carbonate, and about 4.4 wt % polyvinylpyrrolidone, (B) an isocyanate solution that includes about 10 wt % of propylene carbonate, about 90 wt % of MONDUR MR, and (C) silica sand. 4-phenol propyl pyridine was used as a liquid polymerization catalyst. The binder loading was 1.2 wt. % based on the total weight of the silica sand. The foundry mixture was formed into a mold and core for the compressor housing, no graphite wash was applied. Gray Iron was then cast into the foundry shape (including the mold and core) at a pouring temperature of 2550° F. The cast metal was then allowed to cool to about 500° F., the aggregate was removed by shake out.

What is claimed is:

1. A lignite-polyol suspension comprising: a plurality of lignite particles that have an average diameter less than about 20 µm; a polyol; and a dispersing agent, wherein the lignite has a moisture content of 0 wt % to 20 wt % based on the dry weight of the lignite.

2. The lignite-polyol suspension of claim 1, wherein the lignite particles have an average diameter less than about 15 µm.

3. The lignite-polyol suspension of claim 2, wherein the lignite particles have an average diameter less than about 10 µm.

4. The lignite-polyol suspension of claim 1,
wherein polyol is selected from the group consisting of a glycol having a molecular formula of HO—(CH$_2$CH$_2$O)$_x$—H, where x is a value between 1 and about 25; a glycerol; and a mixture thereof; and
wherein the dispersing agent is a polymer selected from the group consisting of (A) a polymer selected from the group consisting of a monoesterified polyethylene glycol, a poly(acrylic acid), a poly(methacrylic acid), a poly(vinyl alcohol), a poly(acrylamide), a poly(ethylene imine), a poly(diallyldimethyl ammonium halide), a poly(vinyl methyl ether), and a mixture thereof; (B) a polyvinylpyrrolidone; (C) a polyvinylpyrrolidone copolymer; and (D) a copolymer of a plurality of monomers selected from the group consisting of propylene oxide, vinyl acetate, vinyl amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, methacrylic acid, and a mixture thereof.

5. The lignite-polyol suspension of claim 4, wherein the dispersing agent is a mixture of polymers selected from the group consisting of (A), (B), (C), and (D).

6. The lignite-polyol suspension of claim 1 further comprising a organic solvent.

7. The lignite-polyol suspension of claim 6 wherein the lignite-polyol suspension consists essentially of
about 0.1 wt. % to about 85 wt. % lignite;
about 15 wt. % to about 90 wt. % polyol;
about 0.01 wt. % to about 30 wt. % dispersing agent; and
a ratio of the organic solvent to the polyol that is about 0.01 to about 9.

8. The lignite-polyol suspension of claim 7, wherein the polyol is triethylene glycol.

9. The lignite-polyol suspension of claim 7, wherein the lignite is leonardite.

10. The lignite-polyol suspension of claim 7, wherein the dispersing agent is a monoesterified polyethylene glycol.

11. The lignite-polyol suspension of claim 7, wherein the organic solvent is propylene carbonate.

* * * * *

UNITED STATES PATENT AND TRADEMARK OFFICE
CERTIFICATE OF CORRECTION

| | |
|---|---|
| PATENT NO. | : 8,802,749 B2 |
| APPLICATION NO. | : 13/867835 |
| DATED | : August 12, 2014 |
| INVENTOR(S) | : Jianbo Di et al. |

It is certified that error appears in the above-identified patent and that said Letters Patent is hereby corrected as shown below:

On the Title Page:

On the Title Page, Item "(60)" should be Item -- (62) --.

In the Claims:

At Column 10, line 5, "a organic" should be -- an organic --.

Signed and Sealed this
Twenty-seventh Day of October, 2015

Michelle K. Lee
*Director of the United States Patent and Trademark Office*